(12) United States Patent
Matsuto et al.

(10) Patent No.: US 11,177,718 B2
(45) Date of Patent: Nov. 16, 2021

(54) ELECTRIC ACTUATOR WITH SCREW SHAFT

(71) Applicant: NTN CORPORATION, Osaka (JP)

(72) Inventors: Takushi Matsuto, Shizuoka (JP); Yoshinori Ikeda, Shizuoka (JP); Yuuki Naitou, Shizuoka (JP)

(73) Assignee: NTN CORPORATION, Osaka (JP)

(*) Notice: Subject to any disclaimer, the term of this patent is extended or adjusted under 35 U.S.C. 154(b) by 509 days.

(21) Appl. No.: 16/083,592

(22) PCT Filed: Mar. 10, 2017

(86) PCT No.: PCT/JP2017/009706
§ 371 (c)(1),
(2) Date: Sep. 10, 2018

(87) PCT Pub. No.: WO2017/169657
PCT Pub. Date: Oct. 5, 2017

(65) Prior Publication Data
US 2020/0313508 A1     Oct. 1, 2020

(30) Foreign Application Priority Data

Mar. 28, 2016   (JP) .............................. JP2016-063956

(51) Int. Cl.
*H02K 7/06* (2006.01)
*H02K 11/21* (2016.01)
(Continued)

(52) U.S. Cl.
CPC ............. *H02K 7/06* (2013.01); *F16H 25/205* (2013.01); *H02K 5/22* (2013.01); *H02K 11/21* (2016.01);
(Continued)

(58) Field of Classification Search
CPC .......... H02K 7/06; H02K 11/21; H02K 11/33; H02K 5/22; F16H 25/205;
(Continued)

(56) References Cited

U.S. PATENT DOCUMENTS 6,081,051 A * 6/2000 Kitazawa ................. H02K 7/06
                                                        310/12.14
6,719,103 B1   4/2004 Kapaan et al.
(Continued)

FOREIGN PATENT DOCUMENTS

CN   108475964   8/2018
CN   108603576   9/2018
(Continued)

OTHER PUBLICATIONS

Extended European Search Report dated Oct. 2, 2019 in corresponding European Patent Application No. 17774201.2.
(Continued)

*Primary Examiner* — John K Kim
(74) *Attorney, Agent, or Firm* — Wenderoth, Lind & Ponack, L.L.P.

(57) ABSTRACT

An electric actuator (1) includes: a motor part (A); a motion conversion mechanism part (B); and a housing (2) configured to house the motor part (A) and the motion conversion mechanism part (B). The motion conversion mechanism part (B) includes: a screw shaft (33); and a nut member (32) rotatably fitted to an outer periphery of the screw shaft. The screw shaft (33) performs a linear motion in an axial direction along with a rotation of the nut member (32). The housing (2) includes a plurality of members coupled to one another in the axial direction. A terminal part (D) (terminal main body (50)) configured to hold a power supply circuit configured to supply drive power to the motor part (A) includes a tubular portion (50A) sandwiched by the mem- (Continued)

bers forming the housing (2) from both sides in the axial direction.

7 Claims, 12 Drawing Sheets

(51) Int. Cl.
    *H02K 11/33*     (2016.01)
    *H02K 5/22*     (2006.01)
    *F16H 25/20*     (2006.01)

(52) U.S. Cl.
    CPC ...... *H02K 11/33* (2016.01); *F16H 2025/2031* (2013.01)

(58) Field of Classification Search
    CPC ..... F16H 2025/2031; F16H 2025/2075; F16H 25/2015; F16H 25/20
    USPC .......................................................... 310/80
    See application file for complete search history.

(56) References Cited

U.S. PATENT DOCUMENTS

| | | | |
|---|---|---|---|
| 6,907,967 B1 * | 6/2005 | Kapaan | F16H 25/22 188/162 |
| 2006/0084544 A1 | 4/2006 | Chou | |
| 2013/0278098 A1 * | 10/2013 | Bourqui | H02K 7/06 310/80 |
| 2016/0294253 A1 | 10/2016 | Fukunaga | |
| 2019/0040939 A1 | 2/2019 | Matsuto et al. | |
| 2019/0040940 A1 | 2/2019 | Matsuto et al. | |
| 2019/0044409 A1 | 2/2019 | Matsuto et al. | |
| 2020/0313508 A1 * | 10/2020 | Matsuto | H02K 11/33 |

FOREIGN PATENT DOCUMENTS

| | | |
|---|---|---|
| CN | 108603577 | 9/2018 |
| DE | 20 2014 103 629 | 10/2014 |
| JP | 8-33262 | 2/1996 |
| JP | 11-72155 | 3/1999 |
| JP | 2003-515074 | 4/2003 |
| JP | 2008-172881 | 7/2008 |
| JP | 2015-104231 | 6/2015 |
| JP | 2015-149799 | 8/2015 |

OTHER PUBLICATIONS

International Preliminary Report on Patentability dated Oct. 2, 2018 in International (PCT) Application No. PCT/JP2017/009706.
Chinese Office Action dated Dec. 18, 2019 in corresponding Chinese Patent Application No. 201780019496.9 with English translation of Search Report.
International Search Report dated May 30, 2017 in International (PCT) Application No. PCT/JP2017/009706.

* cited by examiner

ELECTRIC ACTUATOR WITH SCREW SHAFT

TECHNICAL FIELD

The present invention relates to an electric actuator.

BACKGROUND ART

In recent years, electrification of automobiles has been promoted for power saving and reduction in fuel consumption. For example, a system for operating an automatic transmission, a brake, and a steering wheel of an automobile with use of power of an electric motor (motor) has been developed and brought to the market. As an electric actuator for use in such a system, there has been known an electric actuator employing a screw device (ball screw device) as a motion conversion mechanism configured to convert a rotary motion of a motor into a linear motion to output the motion (for example, see Patent Literature 1). In this case, a screw shaft of the ball screw device forms an output member of the electric actuator.

CITATION LIST

Patent Literature 1: JP 2015-104231 A

SUMMARY OF INVENTION

Technical Problem

Incidentally, in order to drive (the output member of) the electric actuator, at least a power supply circuit configured to supply drive power to the motor is required. However, in Patent Literature 1, how to build the power supply circuit is not mentioned. For example, when the power supply circuit is built each time the electric actuator is assembled, ease of assembly (productivity) of the electric actuator is low, and the cost of the electric actuator thus increases.

The present invention has been made in view of the above-mentioned problem, and therefore has a main object to provide an electric actuator excellent in ease of assembly.

Solution to Problem

The present invention has been made in order to solve the above-mentioned problem, and according to one embodiment of the present invention, there is provided an electric actuator, comprising: a motor part configured to drive upon receiving supply of power; a motion conversion mechanism part configured to convert a rotary motion of the motor part into a linear motion to output the linear motion; and a housing configured to house the motor part and the motion conversion mechanism part, wherein the motion conversion mechanism part comprises: a screw shaft arranged coaxially with a rotation center of a rotor of the motor part; and a nut member rotatably fitted to an outer periphery of the screw shaft, wherein the screw shaft performs a linear motion in an axial direction along with a rotation of the nut member upon receiving a rotary motion of the rotor, wherein the housing comprises a plurality of members coupled to one another in the axial direction, and wherein a terminal part configured to hold a power supply circuit configured to supply the power to the motor part comprises a tubular portion sandwiched by the members forming the housing from both sides in the axial direction.

With such a configuration, the motor part can be brought into a state capable of receiving supply of the drive power by only coupling the members forming the housing to one another in the axial direction to assemble the housing. Therefore, the ease of assembly (productivity) of the electric actuator can be increased, thereby being capable of reducing the cost of the electric actuator.

In the configuration described above, at least a part of a stator of the motor part may be fitted to an inner periphery of the tubular portion of the terminal part. With such a configuration, the stator of the motor part can be assembled to an inner periphery of the housing simultaneously with the assembly of the housing, and the hence ease of assembly of the electric actuator can be further increased.

The terminal part may be configured to hold a rotation angle detection sensor configured to detect a rotation angle of the rotor. When such a sensor is provided, the rotation angle (rotation amount) of the rotor can be detected, thereby being capable of controlling a movement amount of the screw shaft in the axial direction based on the detection value. Therefore, an electric actuator excellent in operation accuracy of the screw shaft (output member) can easily be achieved.

The tubular portion of the terminal part may have an opening portion configured to cause an inside and an outside of the housing to communicate with each other. With such a configuration, a lead line connected to the power supply circuit (forming the power supply circuit) and a signal line connected to the rotation angle detection sensor can be drawn out to a radially outer side of the housing through the opening portion. In this case, a routing operation of electric wires including the lead line, the signal line, and the like can be completed under a state in which the terminal part exists alone, and hence the ease of assembly and productivity of the electric actuator can be further increased. Moreover, when the routing operation of the electric wires can be completed under the state in which the terminal part exists alone, the terminal part can be standardized as long as shapes of coupled portions of members to be coupled to the terminal part remain the same. With this, series production of various types of the electric actuator with standardized components can easily be achieved.

In the configuration described above, the rotor may comprise a hollow rotary shaft, which has the nut member arranged on an inner periphery thereof, and is rotatably supported by rolling bearings arranged at two positions apart from each other in the axial direction. In this case, the hollow rotary shaft may comprise an inner raceway surface of one of the two rolling bearings. With such a configuration, the hollow rotary shaft and the rotor can be downsized in the axial direction. As a result, an electric actuator downsized in the axial direction, and excellent in mountability with respect to a device to be used can be achieved.

In a case in which the inner raceway surface is formed on the hollow rotary shaft, when the inner raceway surface is arranged within an axial width of the nut member, the electric actuator can be further downsized in the axial direction.

The motion conversion mechanism part may comprise a speed reducer configured to reduce a speed of a rotation of the rotor, and transmit the rotation to the nut member. With such a configuration, a small motor can be employed. Thus, there can be achieved the electric actuator that is reduced in weight and size and has excellent mountability with respect to a device to be used. A planetary gear speed reducer can be employed as the speed reducer. When the planetary gear speed reducer is employed, a speed reduction ratio can easily be adjusted through, for example, changing specifications of the gears or changing the number of stages of the installed planetary gears. Further, there is also an advantage in that, even when the planetary gears are installed in a large number of stages, an increase in sizes of the speed reducer and the electric actuator can be avoided.

Advantageous Effects of Invention

As described above, according to one embodiment of the present invention, it is possible to provide the electric actuator excellent in ease of assembly.

DESCRIPTION OF EMBODIMENTS

Now, description is made of embodiments of the present invention with reference to the drawings.

Figure 1:
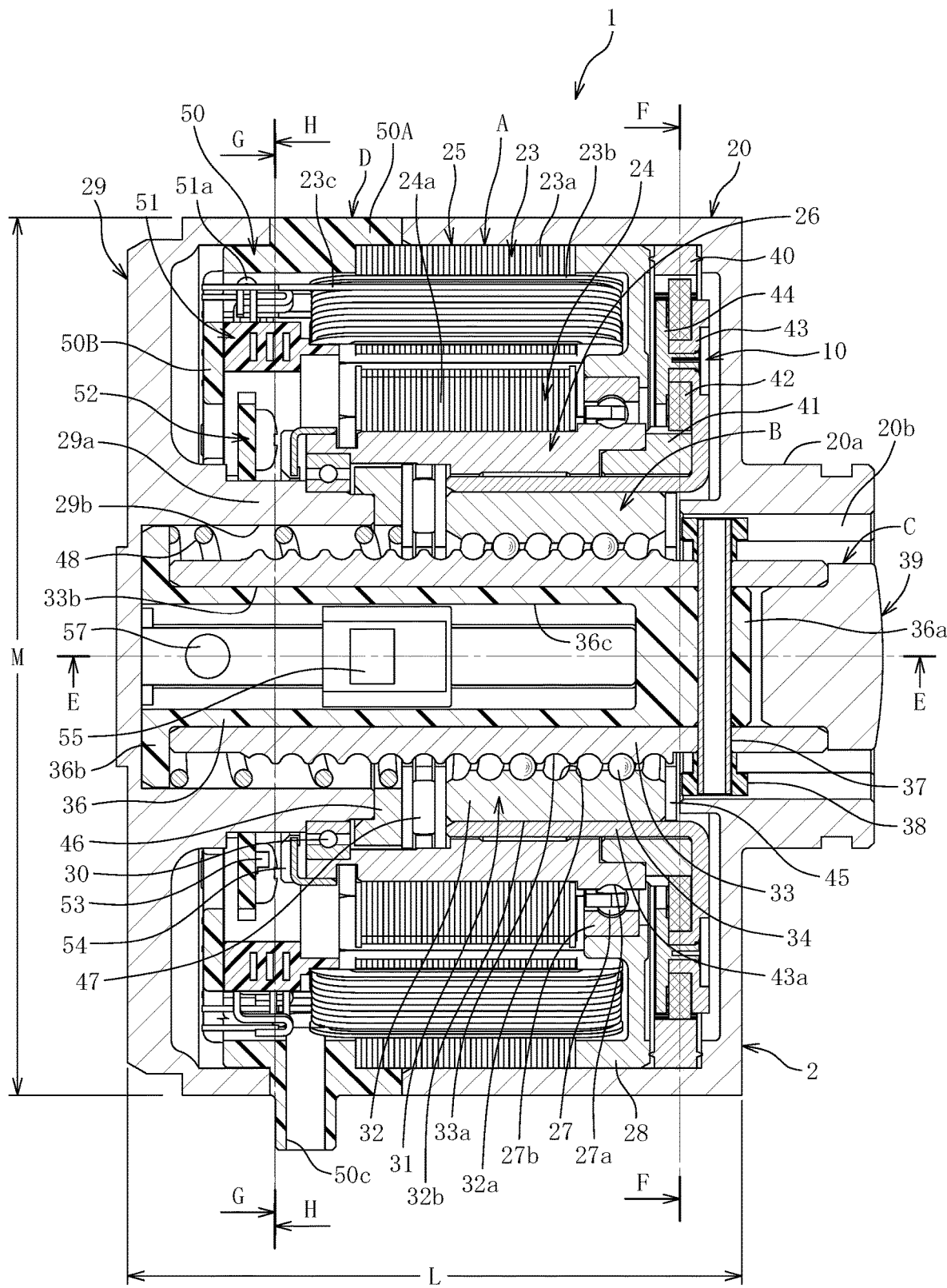
FIG. 1 is a vertical sectional view of an electric actuator according to one embodiment of the present invention.
Figure 2:
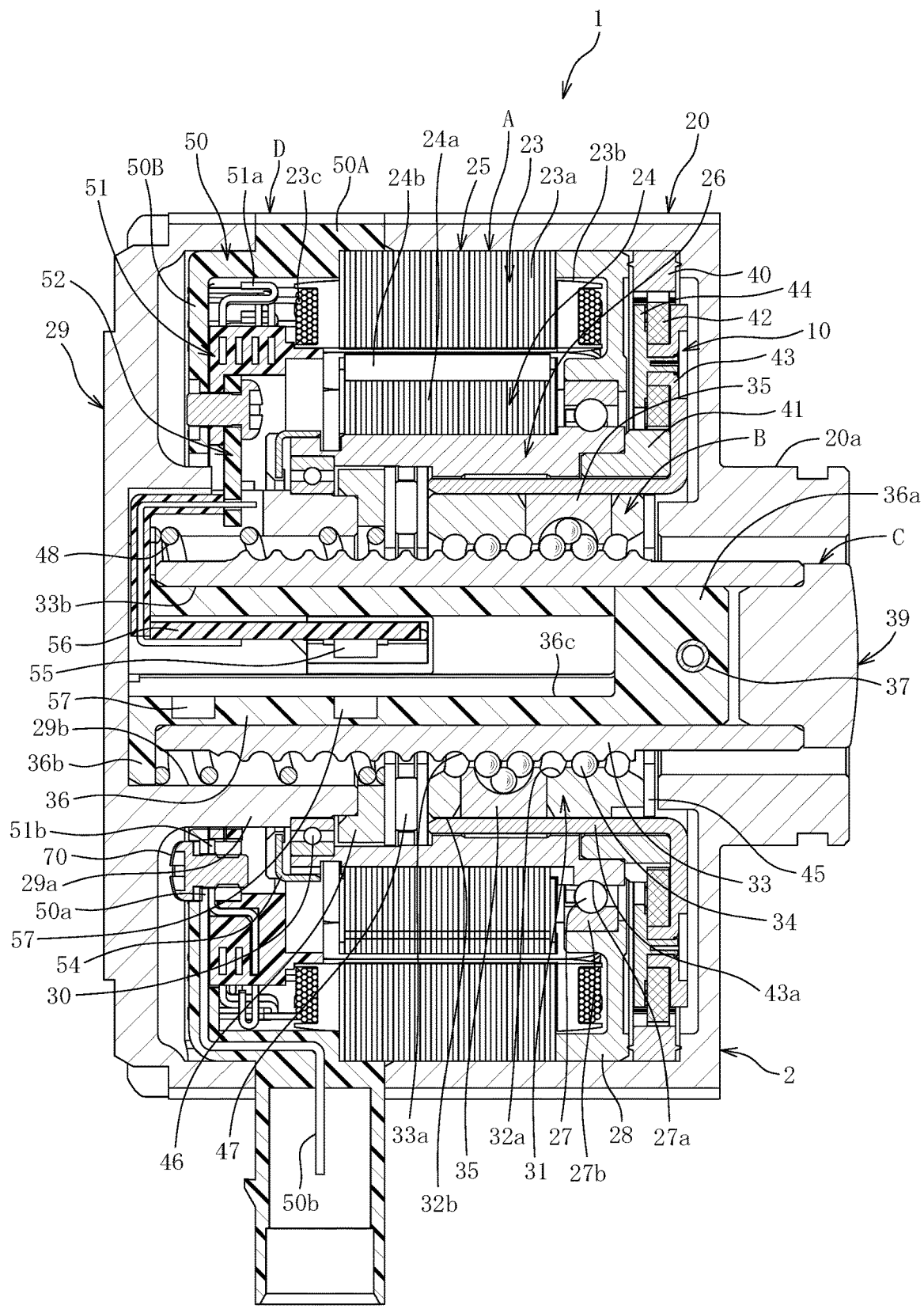
FIG. 2 is a sectional view as seen in a direction indicated by the arrows of the line E-E in FIG. 1.
Figure 3:
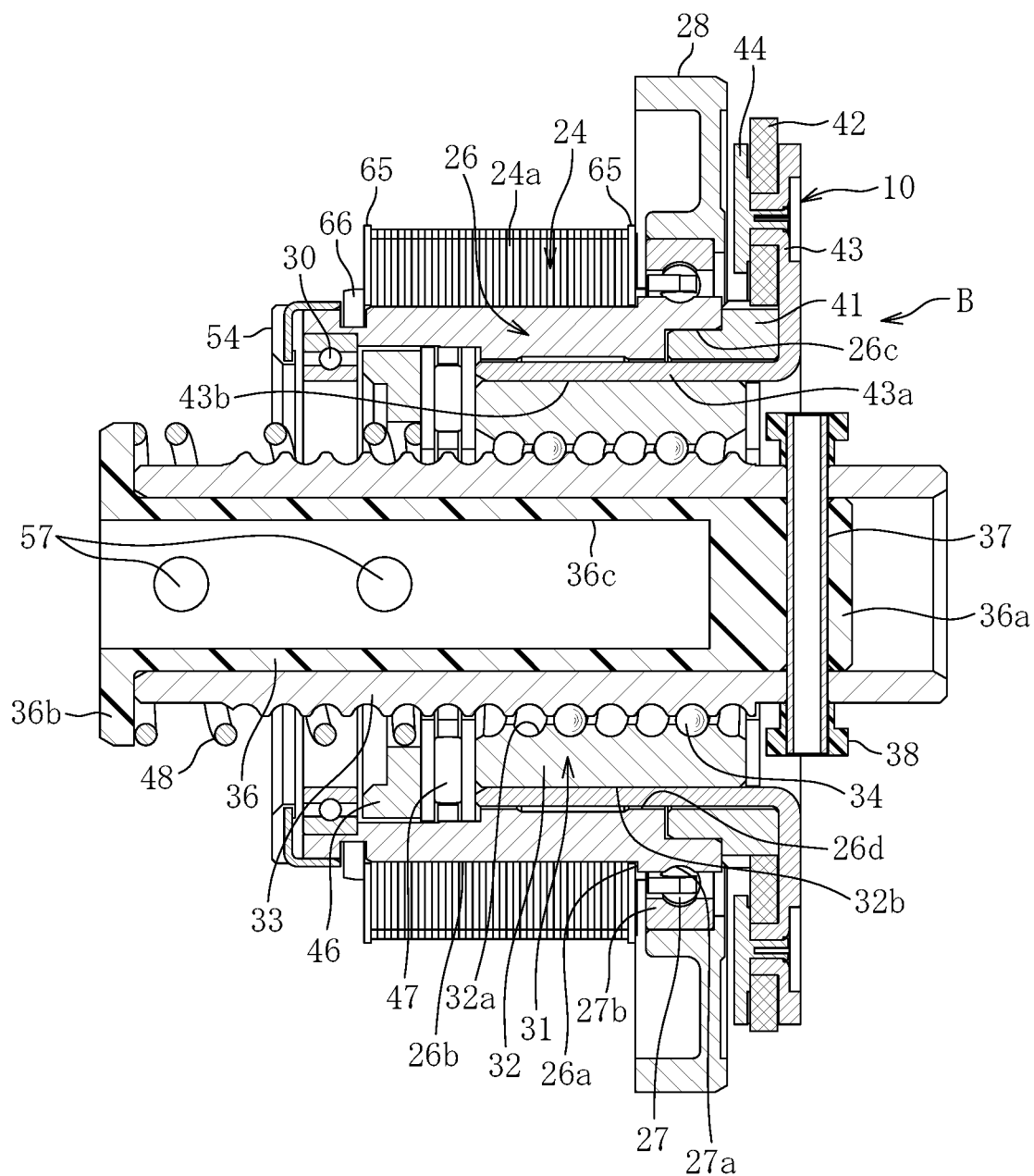
FIG. 3 is an enlarged vertical sectional view for illustrating a rotor of a motor and a motion conversion mechanism part.

FIG. 1 is a vertical sectional view of an electric actuator according to one embodiment of the present invention. FIG. 2 is a sectional view as seen in a direction indicated by the arrows of the line E-E in FIG. 1. FIG. 3 is an enlarged vertical sectional view for illustrating a rotor of a motor part and a motion conversion mechanism part (vertical sectional view of a subassembly formed by assembling the rotor and the motion conversion mechanism part to each other). FIG. 1 and FIG. 2 are illustrations of a state in which a screw shaft 33 that forms an output member of the electric actuator is located at an original point. The "state of being located at the original point" in this embodiment corresponds to a state in which an end surface of (an inner member 36 coupled to) the screw shaft 33 is mechanically brought into abutment against an end surface of a cover 29, which is opposed thereto, by a spring force of a compression coil spring 48 described later.

As illustrated in FIG. 1 and FIG. 2, an electric actuator 1 according to this embodiment comprises a motor part A, a motion conversion mechanism part B, an operation part C, and a terminal part D. The motor part A is configured to be driven upon receiving supply of power. The motion conversion mechanism part B is configured to convert a rotary motion of the motor part A into a linear motion to output the motion. The operation part C is configured to operate an object to be operated (not shown). A housing 2 is configured to house/hold the motor part A, the motion conversion mechanism part B, the operation part C, and the terminal part D.

The housing 2 is formed of a plurality of members coaxially arranged and coupled to one another in an axial direction. The housing 2 according to this embodiment is made of a metal material excellent in ease of processing and thermal conductivity (such as an aluminum alloy, a zinc alloy, or a magnesium alloy), and is formed of a coupled body comprising a casing 20 having a tubular shape, the cover 29, and (a tubular portion 50A of) a terminal main body 50. The casing 20 has an end portion on one side in the axial direction (right side of the drawing sheet in FIG. 1 and FIG. 2, which similarly applies to the following description) and an end portion on another side in the axial direction (left side of the drawing sheet in FIG. 1 and FIG. 2, which similarly applies to the following description), which are opened. The cover 29 is configured to close an opening in the end portion of the casing 20 on the another side in the axial direction. The terminal main body 50 is arranged between the casing 20 and the cover 29, and forms the terminal part D. The cover 29 and the terminal main body 50 are mounted and fixed to the casing 20 by assembly bolts 61 illustrated in FIG. 9 and FIG. 10. Thus, the terminal main body 50 comprises the tubular portion 50A sandwiched and fixed between the casing 20 and the cover 29 arranged on both sides in the axial direction thereof.

The motor part A is formed of a motor 25 of a radial gap type (specifically, a three-phase brushless motor having a U-phase, a V-phase, and a W-phase) comprising a stator 23 fitted and fixed to inner peripheral surfaces of the casing 20 and the tubular portion 50A of the terminal main body 50 and a rotor 24 arranged so as to be opposed to an inner periphery of the stator 23 through a radial gap. The stator 23 comprises a bobbin 23b and a coil 23c. The bobbin 23b for insulation is mounted to a stator core 23a. The coil 23c is wound around the bobbin 23b. The rotor 24 comprises a rotor core 24a, a permanent magnet 24b being a rotor magnet mounted to an outer periphery of the rotor core 24a, and a rotor inner 26 having a hollow shape and being a hollow rotary shaft having the rotor core 24a mounted to an outer periphery thereof.

As illustrated in FIG. 3, after a side plate 65 is set on a shoulder portion 26a of the rotor inner 26 on the one side in the axial direction, the rotor core 24a is fitted to an outer peripheral surface 26b of the rotor inner 26. After the permanent magnet 24b (see FIG. 2) is fitted to the outer periphery of the rotor core 24a, the permanent magnet 24b is positioned and fixed by the side plate 65, which is mounted to the rotor inner 26 on an outer side in the axial direction of the end portion of the rotor core 24a on the another side in the axial direction, and by a circlip 66 mounted on an outer side of the side plate 65 in the axial direction.

As illustrated in FIG. 1 to FIG. 3, on an outer periphery of the end portion of the rotor inner 26 on the one side in the axial direction, an inner raceway surface 27a of a rolling bearing 27 is formed. An outer ring 27b of the rolling bearing 27 is mounted to an inner peripheral surface of a bearing holder 28 fixed to an inner peripheral surface of the casing 20. Moreover, a rolling bearing 30 is mounted between an inner peripheral surface of the end portion of the rotor inner 26 on the another side in the axial direction and an outer peripheral surface of a cylindrical portion 29a of the cover 29. With such a configuration, the rotor inner 26 is supported so as to be rotatable with respect to the housing 2 through the rolling bearings 27 and 30.

As illustrated in FIG. 1 to FIG. 3, the motion conversion mechanism part B of this embodiment comprises a ball screw device 31 and a planetary gear speed reducer 10 being a speed reducer. The planetary gear speed reducer 10 is arranged adjacent to the one side in the axial direction of the motor part A.

The ball screw device 31 comprises the screw shaft 33, a nut member 32, and deflectors 35. The screw shaft 33 is arranged coaxially with a rotation center of the rotor 24, and forms an output member of the electric actuator 1. The nut member 32 is rotatably fitted to an outer periphery of the screw shaft 33 through intermediation of a plurality of balls 34, and is arranged on an inner periphery of the rotor inner 26. The deflectors 35 serve as circulation members. Between a spiral groove 32a formed in an inner peripheral surface of the nut member 32 and a spiral groove 33a formed in an outer peripheral surface of the screw shaft 33, the plurality of balls 34 are loaded, and the deflectors 35 are incorporated. With such a configuration, when the screw shaft 33 performs a linear motion in the axial direction along with the rotation of the nut member 32, the balls 34 circulate between the spiral grooves 32a and 33a.

The screw shaft 33 is formed into a hollow shape with a hole portion (in this embodiment, a through hole that is opened in end surfaces on both sides in the axial direction) 33b extending in the axial direction, and the inner member 36 is received in the hole portion 33b. The inner member 36 is made of a resin material such as PPS, and integrally comprises a circular solid portion 36a, a flange portion 36b, and a cylinder portion 36c. The circular solid portion 36a is formed in an end portion of the inner member 36 on the one side in the axial direction. The flange portion 36b is formed in an end portion of the inner member 36 on the another side in the axial direction. The cylinder portion 36c connects the circular solid portion 36a and the flange portion 36b to each other.

The inner member 36 received in the hole portion 33b of the screw shaft 33 is coupled and fixed to the screw shaft 33 in such a manner that a pin 37 is fitted so as to penetrate through the circular solid portion 36a and the screw shaft 33 in a radial direction. Both end portions of the pin 37 project toward a radially outer side from the outer peripheral surface of the screw shaft 33, and guide collars 38 are externally fitted to the projecting portions so as to be rotatable. The guide collars 38 are made of a resin material such as PPS, and are fitted to guide grooves 20b (also see FIG. 5) in the axial direction formed in an inner peripheral surface of a small-diameter cylindrical portion 20a of the casing 20. With such a configuration, when the nut member 32 rotates about an axis of the screw shaft 33 along with rotation of the rotor 24, the screw shaft 33 performs a linear motion in the axial direction while being stopped in rotation. Whether the screw shaft 33 performs a linear motion (advances) from the another side in the axial direction toward the one side in the axial direction or performs a linear motion (retreats) from the one side in the axial direction toward the another side in the axial direction is basically determined in accordance with a rotation direction of the rotor 24 (nut member 32). In this embodiment, the screw shaft 33 is retreatable also by a spring force of the compression coil spring 48 (details are described later).

As illustrated in FIG. 1 and FIG. 2, an actuator head 39 serving as the operation part C is removably mounted to an end portion of the screw shaft 33 on the one side in the axial direction. The actuator head 39 of this embodiment is of a so-called pressing type in which a distal end surface of the screw shaft 33 presses an object to be operated in the axial direction along with the linear motion of the screw shaft 33 toward the one side in the axial direction. As the actuator head 39, there may be employed a so-called pushing/pulling type, which can operate an object to be operated toward the both sides in the axial direction. Which type/shape of the actuator head 39 is to be used is determined in consideration of a device (a shape and an operation form of the object to be operated) in which the electric actuator 1 is to be used and mounted.

As illustrated in FIG. 1 to FIG. 4, the planetary gear speed reducer 10 comprises a ring gear 40, a sun gear 41, a plurality of (four in this embodiment) planetary gears 42, a planetary gear carrier 43, and planetary gear holders 44. The ring gear 40 is fixed to the casing 20. The sun gear 41 is press-fitted and fixed to a step-portion inner peripheral surface 26c of the rotor inner 26. The planetary gears 42 are arranged between the ring gear 40 and the sun gear 41, and mesh with both the gears 40 and 41. The planetary gear carrier 43 and the planetary gear holders 44 rotatably hold the planetary gears 42. The planetary gear carrier 43 is configured to extract a revolving motion of the planetary gears 42 to output the motion. Thus, the planetary gear carrier 43 forms an output member of the planetary gear speed reducer 10.

Figure 4:
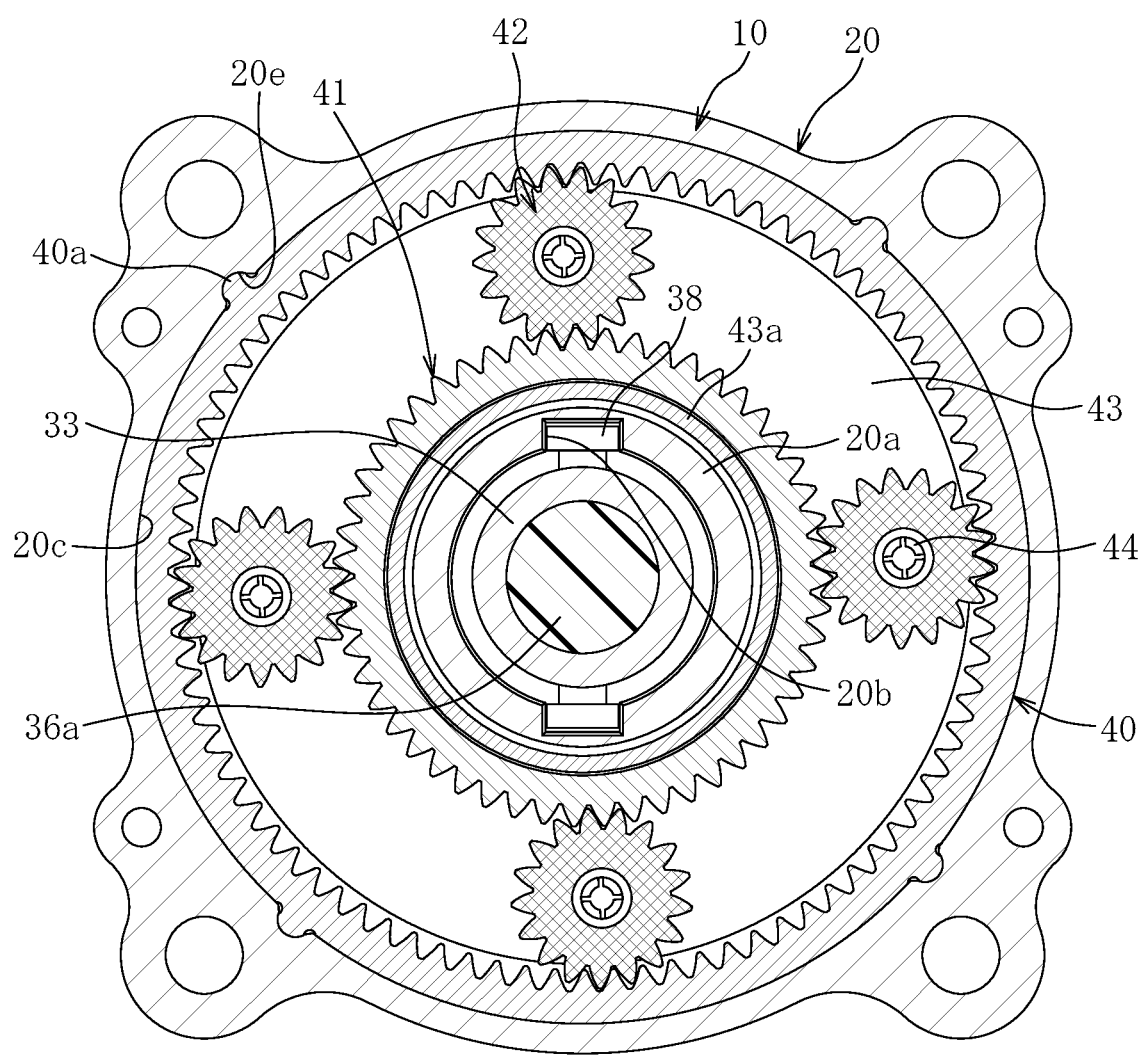
FIG. 4 is a sectional view as seen in a direction indicated by the arrows of the line F-F in FIG. 1.

As illustrated in FIG. 4, notches 40a which project radially outward are formed on an outer periphery of the ring gear 40 at a plurality of positions (four positions in the illustrated example) apart from one another in a circumferential direction. The notches 40a are fitted to axial grooves 20e (also see FIG. 5) formed in an inner peripheral surface 20c of the casing 20 at a plurality of positions (four positions in the illustrated example) apart from one another in the circumferential direction. With this configuration, the ring gear 40 is stopped in rotation with respect to the casing 20.

As illustrated in FIG. 1 to FIG. 3, the planetary gear carrier 43 integrally comprises pin-shaped portions, a disc-shaped portion, and a cylindrical portion 43a. The pin-shaped portions are respectively fitted to inner peripheries of the planetary gears 42. The disc-shaped portion is arranged on the one side in the axial direction of the planetary gears 42. The cylindrical portion 43a extends from an end portion on a radially inner side of the disc-shaped portion toward the another side in the axial direction, and is interposed between an inner peripheral surface 26d of the rotor inner 26 and an outer peripheral surface 32b of the nut member 32. The planetary gear carrier 43 can rotate relative to the rotor inner 26, and is coupled to the nut member 32 of the ball screw device 31 so as to be integrally rotatable. In this embodiment, an outer peripheral surface of the cylindrical portion 43a is opposed to the inner peripheral surface 26d of the rotor inner 26 (and an inner peripheral surface of the sun gear 41) through a radial gap, and an inner peripheral surface of the cylindrical portion 43a is press-fitted and fixed to the outer peripheral surface 32b of the nut member 32.

When the planetary gear carrier 43 and the nut member 32 are coupled to each other in a torque transmittable manner through the press-fitting of the inner peripheral surface of the cylindrical portion 43a to the outer peripheral surface 32b of the nut member 32 in this way, ease of coupling operation at the time of assembly is excellent, and stable torque transmission can be performed with respect to high torque after reduction in speed. Moreover, the rotor inner 26 and the sun gear 41 are coupled to each other in a torque transmittable manner through the press-fitting of the sun gear 41 to the step-portion inner peripheral surface 26c of the rotor inner 26. Thus, the ease of coupling operation at the time of assembly is excellent also in terms of this point. Even when such a coupling structure is employed, the sun gear 41 is only required to rotate together with the rotor inner 26 before reduction in speed, and hence the torque transmission performance required between the sun gear 41 and the rotor inner 26 can be sufficiently secured. Further, the rotor inner 26 and the sun gear 41 are coupled to each other at a position directly below the rolling bearing 27 configured to support the rotor inner 26. Thus, the rotation accuracy of the sun gear 41 is also excellent.

With the planetary gear speed reducer 10 having the configuration described above, the rotary motion of the rotor 24 of the motor 25 is reduced in speed and transmitted to the nut member 32. With this action, rotation torque can be increased. Thus, the motor 25 having a small size can be employed.

As illustrated in FIG. 1 to FIG. 3, a thrust washer 45 is provided between an end surface of the nut member 32 on the one side in the axial direction and the casing 20, and a needle roller bearing 47 being a thrust bearing is provided between a thrust receiving ring 46 mounted to an outer periphery of a distal end portion of the cylindrical portion 29a of the cover 29 and an end surface of the nut member 32 on the another side in the axial direction.

As illustrated in FIG. 1 and FIG. 2, the compression coil spring 48 is provided between an inner peripheral surface 29b of the cylindrical portion 29a of the cover 29 and the outer peripheral surface of the screw shaft 33. End portions of the compression coil spring 48 on the one side and the another side in the axial direction are held in abutment against the needle roller bearing 47 and the flange portion 36b of (the inner member 36 coupled to) the screw shaft 33, respectively.

With a spring force of the compression coil spring 48 provided in such a manner, the screw shaft 33 is always urged toward the original point side. With such a configuration, for example, when drive power is not properly supplied to the motor 25, the screw shaft 33 is automatically returned to the original point, thereby being capable of reducing as much as possible the risk of causing an adverse influence on the operation of the object to be operated (not shown). Moreover, when the compression coil spring 48 is provided in the above-mentioned mode, a preload can be applied to the nut member 32 in the axial direction. With this, a response lag caused by an operating internal clearance formed between the nut member 32 and the screw shaft 33 is eliminated, thereby being capable of increasing the operability of the screw shaft 33.

Figure 9:
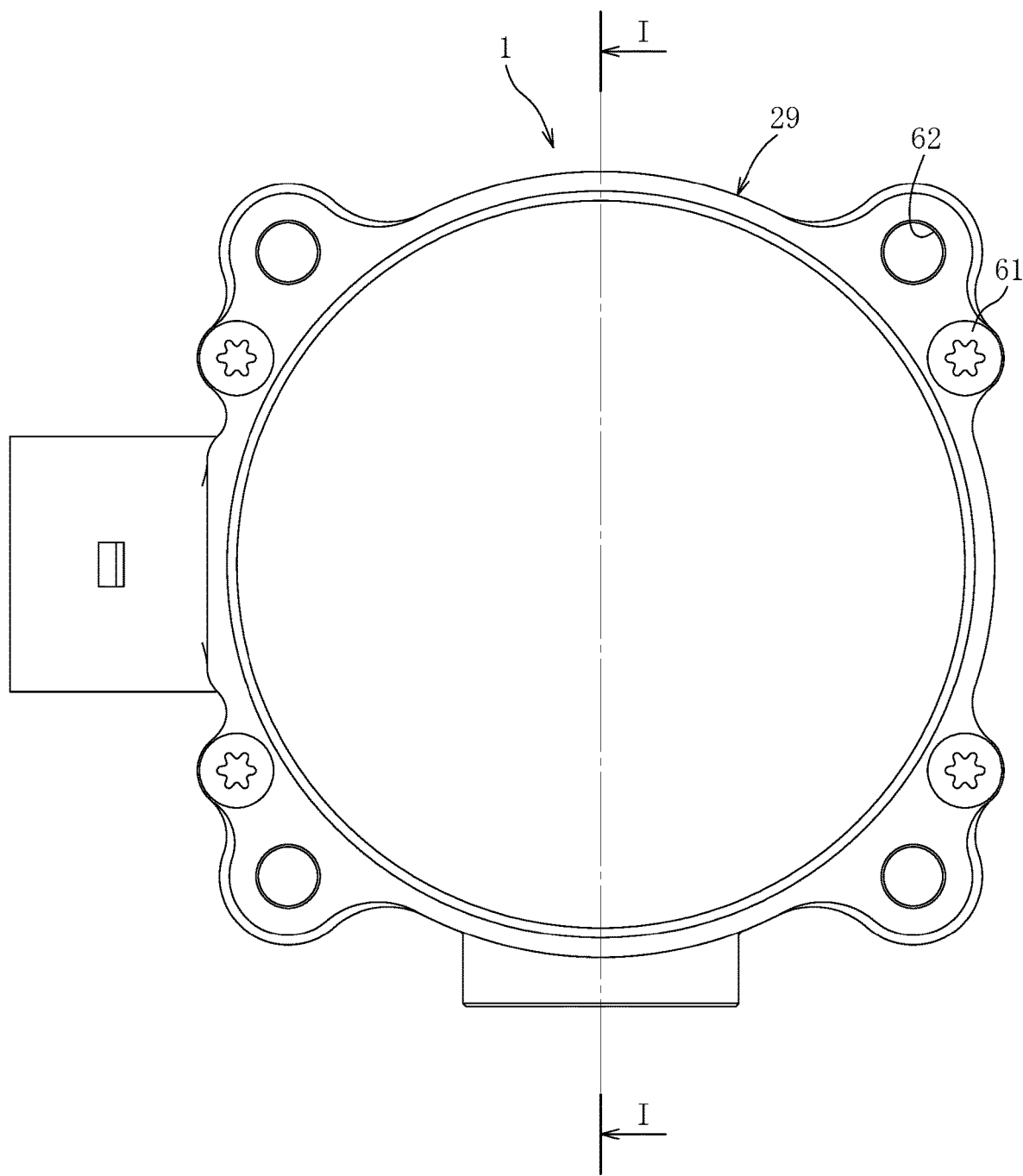
FIG. 9 is a left side view of the electric actuator illustrated in FIG. 1.
Figure 10:
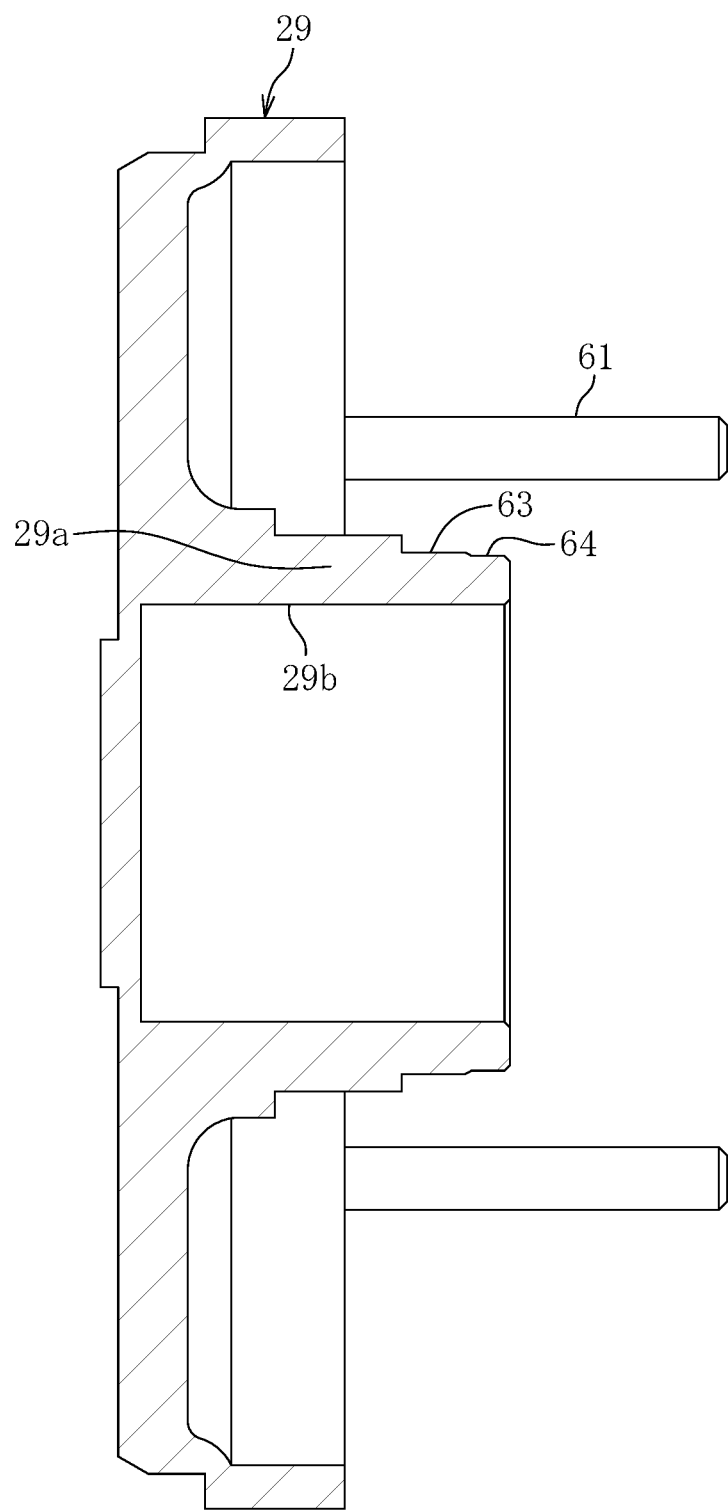
FIG. 10 is a sectional view as seen in a direction indicated by the arrows of the line I-I in FIG. 9.

Details of the cover 29 are described with reference to FIG. 9 and FIG. 10. FIG. 9 is a left side view of FIG. 1. FIG. 10 is a sectional view as seen in a direction indicated by the arrows of the line I-I in FIG. 9. The cover 29 is made of a metal material excellent in ease of processing and thermal conductivity, such as an aluminum alloy, a zinc alloy, or a magnesium alloy. Although not illustrated, a cooling fin configured to increase cooling efficiency of the electric actuator 1 may be provided on an outer surface of the cover 29. As illustrated in FIG. 10, on an outer peripheral surface of the cylindrical portion 29a of the cover 29, there are formed a bearing mounting surface 63 to which the rolling bearing 30 is mounted, and a fitting surface 64 to which the thrust receiving ring 46 is fitted. Moreover, as illustrated in FIG. 9, the cover 29 has through holes (not shown) into which the assembly bolts 61 of the electric actuator 1 are inserted, and through holes 62 into which mounting bolts for mounting the electric actuator 1 to a device to be used are inserted.

Figure 6:
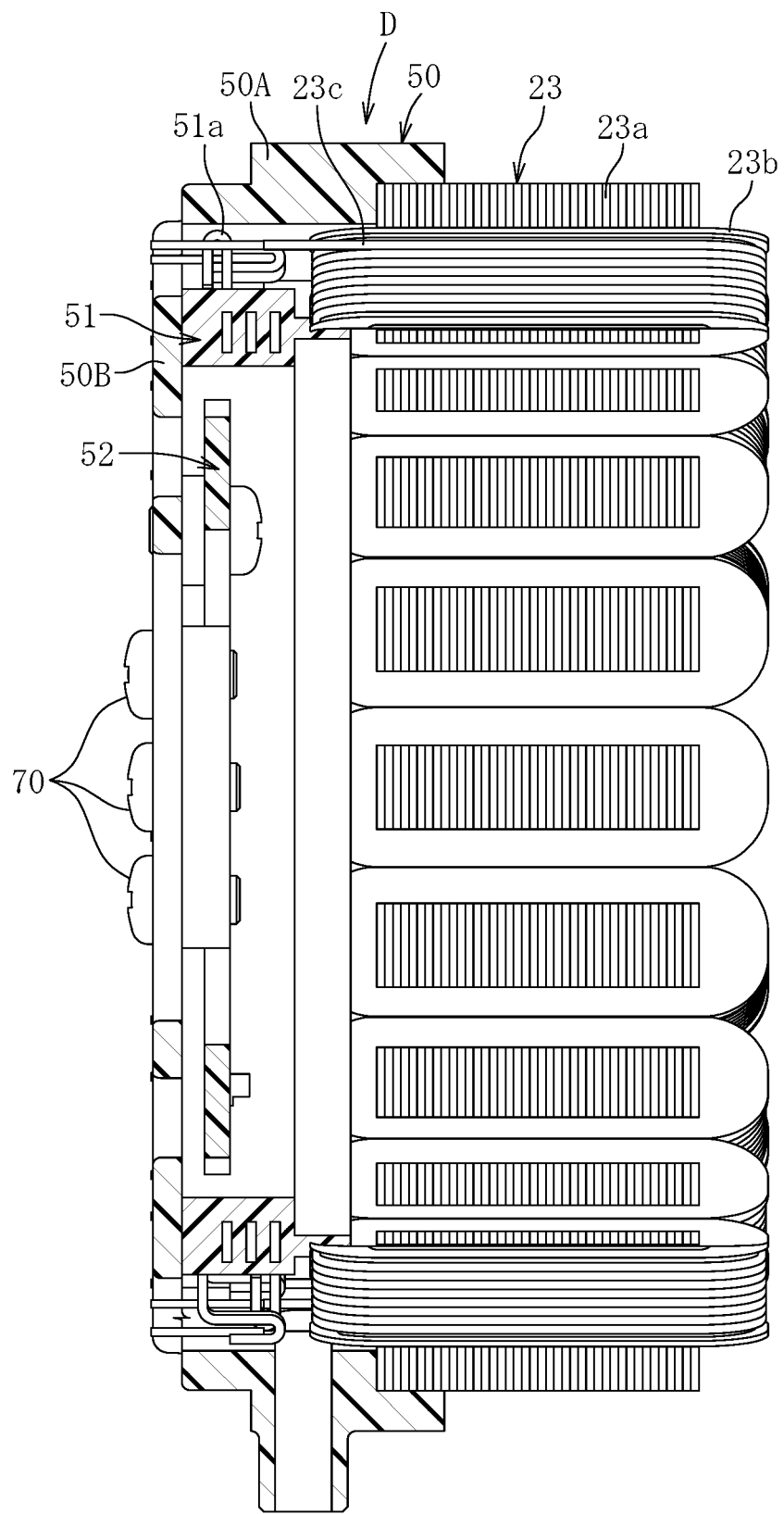
FIG. 6 is a vertical sectional view of a stator of the motor and a terminal part, which are extracted and enlarged.
Figure 7:
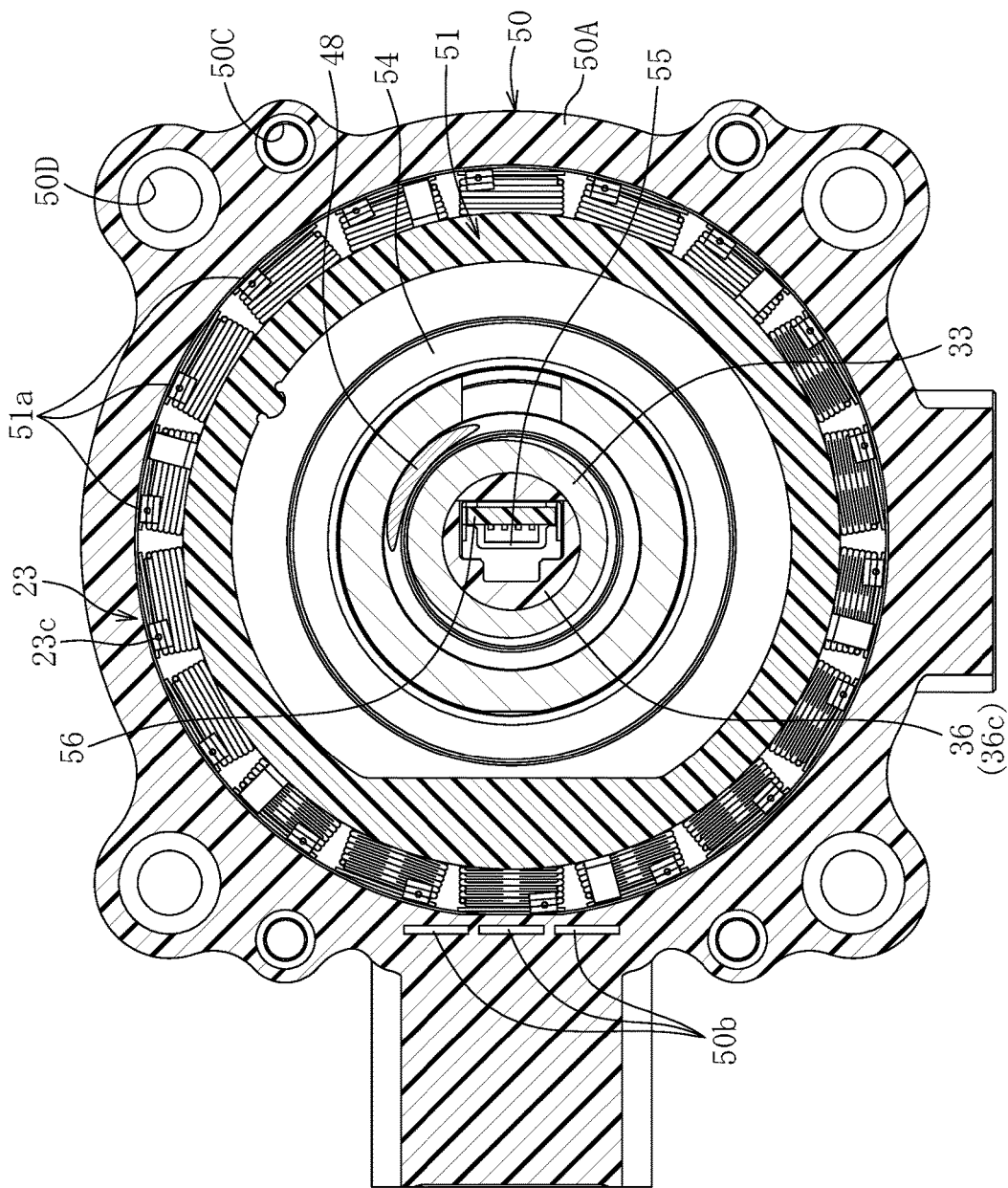
FIG. 7 is a sectional view as seen in a direction indicated by the arrows of the line G-G in FIG. 1.
Figure 8:
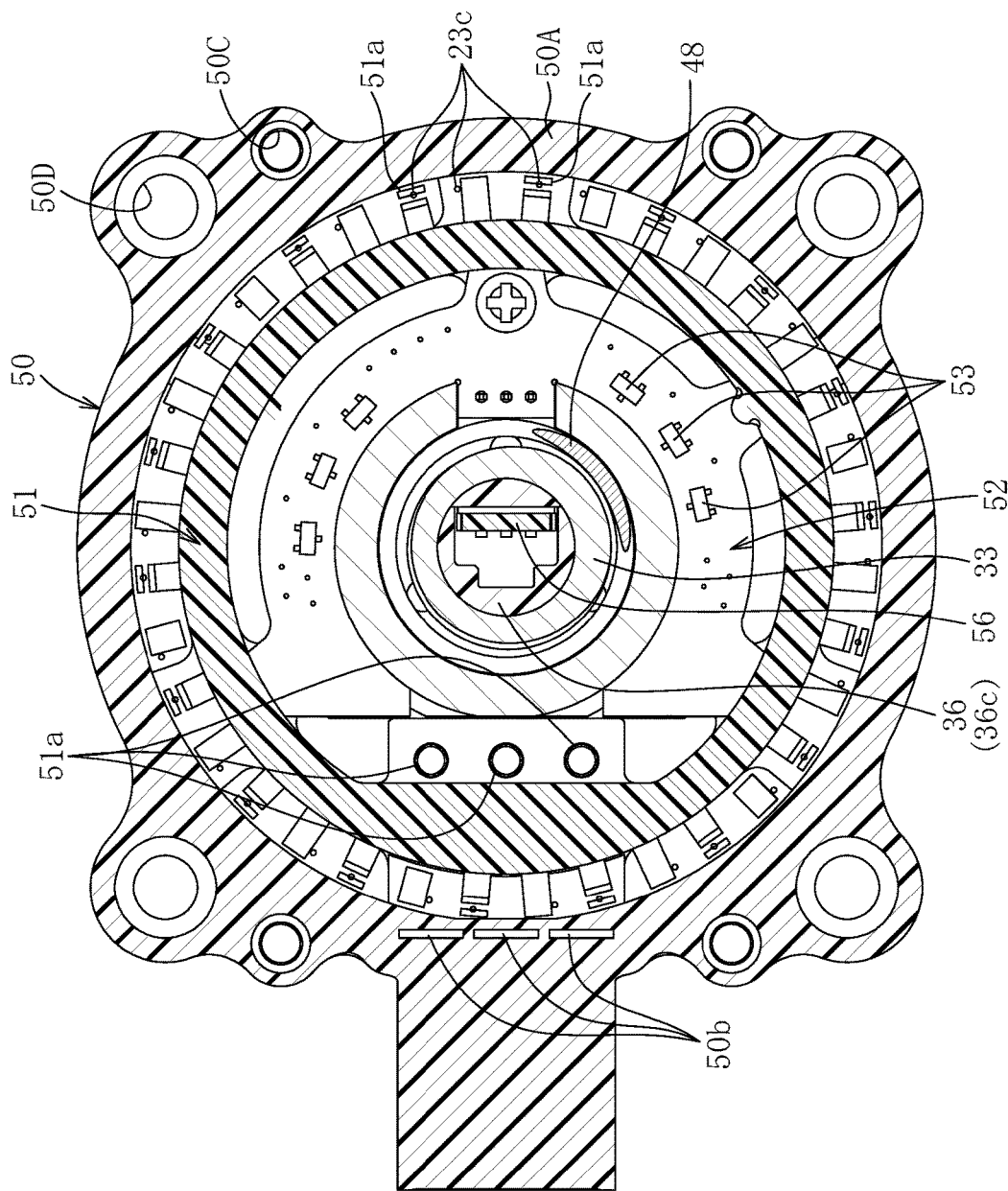
FIG. 8 is a sectional view as seen in a direction indicated by the arrows of the line H-H in FIG. 1.

Next, with reference to FIG. 1 and FIG. 6 to FIG. 8, description is made of the terminal part D. FIG. 6 is a vertical sectional view of the stator 23 of the motor 25 and the terminal part D, which are extracted and enlarged from FIG. 1, (a vertical sectional view of a subassembly comprising the stator 23 and the terminal part D assembled to each other). FIG. 7 is a sectional view as seen in a direction indicated by the arrows of the line G-G in FIG. 1. FIG. 8 is a sectional view as seen in a direction indicated by the arrows of the line H-H in FIG. 1. As illustrated in FIG. 1 and FIG. 6, the terminal part D is made of a resin material such as PPS, and comprises the terminal main body 50, a bus bar 51, and a disc-shaped print board 52. The terminal main body 50 integrally comprises the tubular portion 50A and a disc-shaped portion 50B. The tubular portion 50A forms a part of the housing 2. The disc-shaped portion 50B extends radially inward from an end portion of the tubular portion 50A on the another side in the axial direction. The bus bar 51 and the print board 52 are fixed by screws to (the disc-shaped portion 50B of) the terminal main body 50. As illustrated in FIG. 7 and FIG. 8, (the tubular portion 50A of) the terminal main body 50 has through holes 50C into which the assembly bolts 61 illustrated in FIG. 9 and FIG. 10 are inserted, and through holes 50D into which bolts for mounting the electric actuator 1 to a device to be used are inserted. The terminal main body 50 is sandwiched between the casing 20 and the cover 29 by the above-mentioned assembly bolts 61 (see FIG. 1 and FIG. 2).

The terminal part D (terminal main body 50) collectively holds electrical components such as a power supply circuit for supplying drive power to the motor 25, and sensors described later. The power supply circuit is formed by connecting the coil 23c of the stator 23 to terminals 51a of the bus bar 51 for respective phases of a U-phase, a V-phase, and a W-phase as illustrated in FIG. 7 and FIG. 8, and fastening a terminal 51b of the bus bar 51 and a terminal base 50a of the terminal main body 50 with each other by a screw 70 as illustrated in FIG. 2. The terminal base 50a comprises a terminal 50b to which a lead line (not shown) is connected, and the lead line is drawn out to a radially outer side of the housing 2 through an opening portion 50c (see FIG. 1) formed in the tubular portion 50A of the terminal main body 50 so as to cause an inside and an outside of the housing 2 to communicate with each other, and is connected to a controller 81 of a control device 80 (see FIG. 11).

Two types of sensors are mounted to the electric actuator 1 of this embodiment. Those two types of sensors are held on the terminal main body 50. As illustrated in, for example, FIG. 1, one of the two types of sensors is a rotation angle detection sensor 53 for use in rotation control of the motor 25, and another is a stroke detection sensor 55 for use in stroke control (detection of an amount of displacement in the axial direction) of the screw shaft 33. For each of the rotation angle detection sensor 53 and the stroke detection sensor 55, there is used a Hall sensor being one type of magnetic sensors.

As illustrated in FIG. 1 and FIG. 8, the rotation angle detection sensor 53 is mounted to the print board 52, and is arranged so as to be opposed to a pulser ring 54, which is mounted to an end portion of the rotor inner 26 on the another side in the axial direction, through an axial gap. The rotation angle detection sensor 53 is configured to determine timings of causing an electric current to flow through the U-phase, the V-phase, and the W-phase of the motor 25.

As illustrated in FIG. 2, FIG. 7, and FIG. 8, the stroke detection sensor 55 is mounted to a band-shaped print board 56. The print board 56 extends in the axial direction, and an end portion of the print board 56 on the another side in the axial direction is connected to the print board 52. The print board 56 and the stroke detection sensor 55 are arranged in an inner periphery of the hole portion 33b of the screw shaft 33, more specifically, on an inner periphery of the cylinder portion 36c of the inner member 36 received in the hole portion 33b. Moreover, on the inner periphery of the cylinder portion 36c of the inner member 36, permanent magnets 57 being targets are mounted so as to be opposed to the stroke detection sensor 55 through a radial gap. In this embodiment, the permanent magnets 57 are mounted at two positions apart from each other in the axial direction. The stroke detection sensor 55 is configured to detect a magnetic field in the axial direction and a magnetic field in the radial direction that are formed around the permanent magnets 57, and to calculate the amount of displacement of the screw shaft 33 in the axial direction based on the detection of the magnetic fields.

Figure 11:
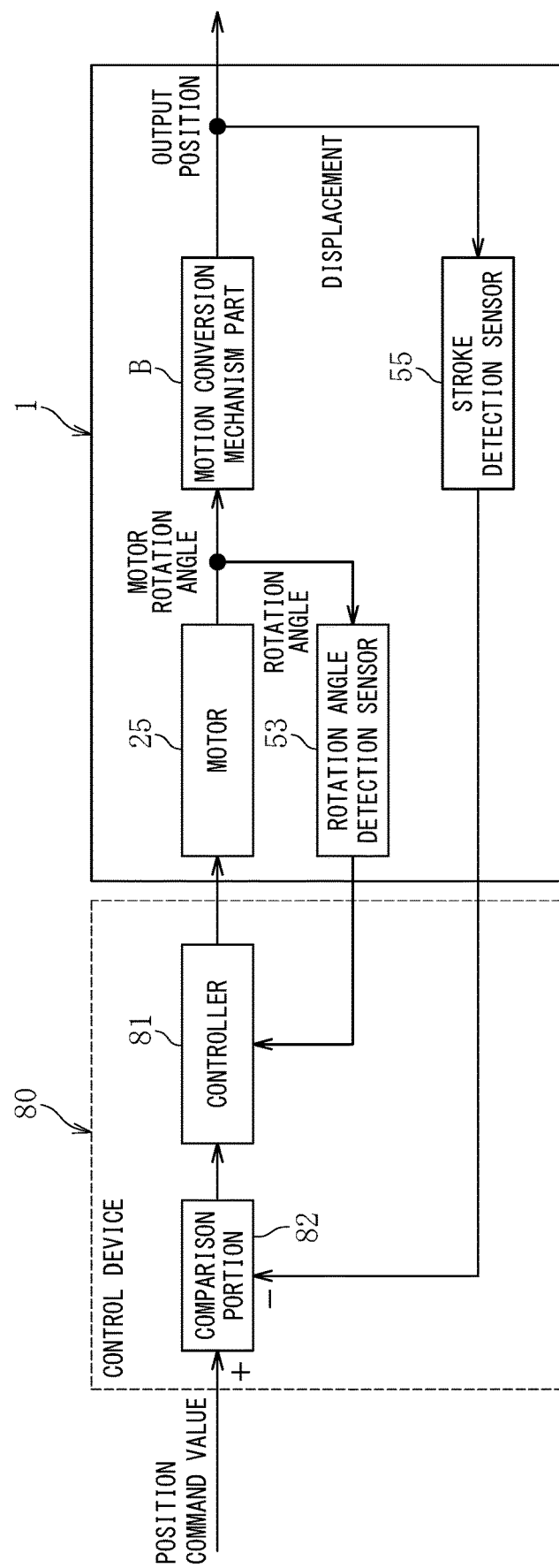
FIG. 11 is a schematic block diagram for illustrating a control system for the electric actuator of FIG. 1.

Although detailed illustration is omitted, a signal line connected to the rotation angle detection sensor 53 and a signal line connected to the stroke detection sensor 55 are each drawn out to the radially outer side of the housing 2 through the opening portion 50c (see FIG. 1) formed in the tubular portion 50A of the terminal main body 50, and connected to the control device 80 (see FIG. 11).

Figure 5:
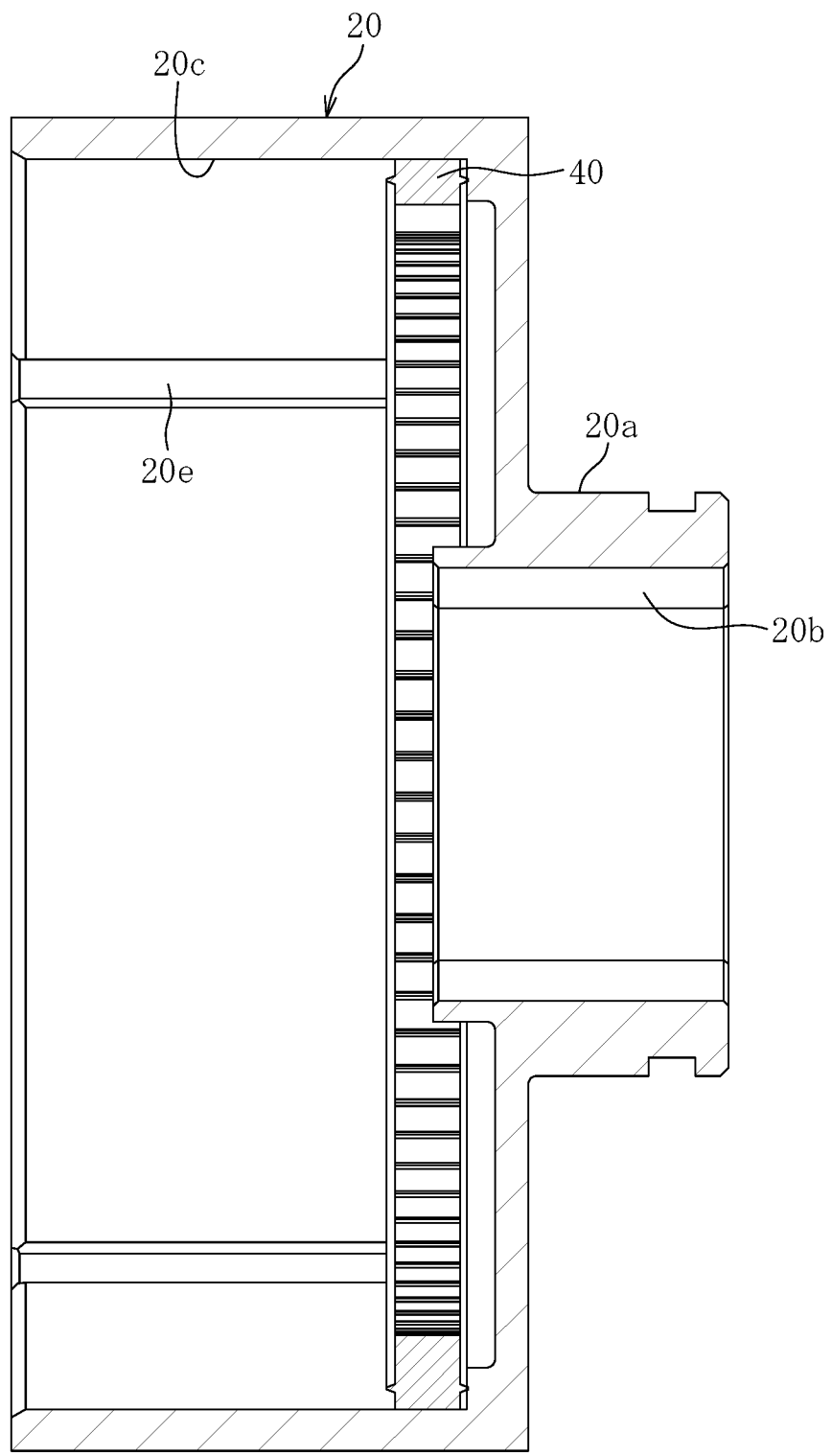
FIG. 5 is a vertical sectional view for illustrating a state in which a ring gear is assembled to a casing.

A procedure of assembling the electric actuator 1 having the above-mentioned configuration is briefly described. First, as illustrated in FIG. 5, the ring gear 40 is assembled to the casing 20. Next, a subassembly comprising the rotor 24 of the motor 25 and the motion conversion mechanism part B illustrated in FIG. 3 is inserted into the casing 20. At this time, the planetary gears 42 are brought into mesh with the ring gear 40, and the guide collars 38 are fitted to the guide grooves 20b of the casing 20. Further, the bearing holder 28 is fitted to the inner peripheral surface 20c of the casing 20. After that, of the subassembly comprising the stator 23 of the motor 25 and the terminal part D (terminal main body 50) illustrated in FIG. 6, the stator 23 is fitted to the inner periphery of the casing 20, and then the cover 29 and the terminal main body 50 are fastened to the casing 20 by the assembly bolts 61 (see FIG. 9 and FIG. 10). In such a manner, the electric actuator 1 is brought into completion.

With reference to FIG. 1 and FIG. 11, an operation mode of the electric actuator 1 having the configuration described above is briefly described. For example, when an operation amount is input to an ECU (not shown) provided at an upper position of the vehicle, the ECU calculates a requested position command value based on the operation amount. As illustrated in FIG. 11, the position command value is transmitted to the controller 81 of the control device 80, and the controller 81 calculates a control signal of a rotation angle of the motor required in accordance with the position command value, and transmits the control signal to the motor 25.

When the rotor 24 rotates based on the control signal transmitted from the controller 81, the rotary motion is transmitted to the motion conversion mechanism part B. Specifically, when the rotor 24 rotates, the sun gear 41 of the planetary gear speed reducer 10 coupled to the rotor inner 26 rotates. Along with this rotation, the planetary gears 42 revolve, and the planetary gear carrier 43 rotates. With this, the rotary motion of the rotor 24 is transmitted to the nut member 32 coupled to the cylindrical portion 43a of the planetary gear carrier 43. At this time, the revolving motion of the planetary gears 42 reduces the rotation number of the rotor 24, thereby increasing rotation torque transmitted to the nut member 32.

When the nut member 32 rotates upon receiving the rotary motion of the rotor 24, the screw shaft 33 performs the linear motion toward the one side in the axial direction (advances) while being stopped in rotation. At this time, the screw shaft 33 advances to a position based on the control signal of the controller 81, and the actuator head 39 fixed to the end portion of the screw shaft 33 on the one side in the axial direction operates (applies pressure to) an object to be operated (not shown).

An axial position (amount of displacement in the axial direction) of the screw shaft 33 is directly detected by the stroke detection sensor 55 as illustrated in FIG. 11, and a detection signal thereof is transmitted to a comparison portion 82 of the control device 80. The comparison portion 82 calculates a difference between a detection value detected by the stroke detection sensor 55 and the position command value, and the controller 81 transmits a control signal to the motor 25 based on the calculated value and the signal transmitted from the rotation angle detection sensor 53. In such a manner, a position of the screw shaft 33 (actuator head 39) in the axial direction is subjected to feedback control. Therefore, when the electric actuator 1 of this embodiment is applied to, for example, a shift-by-wire system, a shift position can be reliably controlled. The power for driving the motor 25, the sensors 53 and 55, and the like is supplied from an external power supply (not shown), such as a battery provided on the vehicle, to the motor 25 and the like through the control device 80 and the power supply circuit held by the terminal portion D.

In the electric actuator 1 of this embodiment described above, the terminal part D (terminal main body 50) comprises the tubular portion 50A sandwiched from the both sides in the axial direction by the casing 20 and the cover 29 forming the housing 2. The terminal part D is configured to hold the electrical components such as the power supply circuit configured to supply the drive power to the motor 25, the rotation angle detection sensor 53 configured to detect the rotation angle of the rotor 24 of the motor 25, and the stroke detection sensor 55 configured to detect a movement amount of the screw shaft 33 in the axial direction. That is, the electric actuator 1 of this embodiment employs such a sandwich structure that the terminal main body 50 holding the electrical components such as the power supply circuit collectively is sandwiched in the axial direction by the casing 20 and the cover 29. With such a configuration, the electric actuator 1 capable of supplying the drive power to the motor 25, and accurately controlling the rotation angle of the motor 25 and the movement amount of the screw shaft 33 can easily be achieved by simply coupling the casing 20, the terminal main body 50, and the cover 29 forming the housing 2 one another in the axial direction to assemble the housing 2. Therefore, the electric actuator 1 excellent in ease of assembly (productivity) and operation accuracy can be achieved.

Moreover, in this embodiment, as illustrated in FIG. 1, FIG. 6, and the like, a part (an outer periphery of an end portion on the another side in the axial direction) of the stator 23 of the motor 25 is fitted to the inner periphery of the tubular portion 50A of the terminal main body 50. In this case, the stator 23 can be assembled to the inner periphery of the housing 2 simultaneously with the assembly of the housing 2, and hence the ease of assembly of the electric actuator 1 further increases also in this respect.

Moreover, the tubular portion 50A of the terminal main body 50 comprises the opening portion 50c configured to cause the inside and the outside of the housing 2 to communicate with each other, and the lead line connected to the power supply circuit and the signal lines (electric wires) connected to the above-mentioned sensors 53 and 55 are drawn out to the radially outer side of the housing 2 through the opening portion 50c. In this case, a routing operation of the electric wires can be completed under a state in which the terminal main body 50 exists alone, in other words, the electric system required to properly and accurately operate the electric actuator 1 can be intensively held by the terminal main body 50 before the housing 2 (electric actuator 1) is assembled. With this, it is not required that the complex wiring operation be independently carried out in the assembly stage of the electric actuator 1, and hence the ease of assembly of the electric actuator 1 can be further increased.

Moreover, when the routing operation of the electric wires can be completed under the state in which the terminal main body 50 exists alone as described above, even when specifications of, for example, the motor 25 and the planetary gear speed reducer 10 are changed, the terminal main body 50 can be standardized as long as shapes of coupled portions of members (in particular, the casing 20 in this case) to be coupled to the terminal main body 50 remain the same. With this, series production of various types of the electric actuator 1 with standardized components can easily be achieved.

Moreover, through a combination of the downsizing of the motor part A (motor 25) achieved by providing the planetary gear speed reducer 10 in the motion conversion mechanism part B and the overlap structure in the radial direction of the rotor inner 26, the cylindrical portion 43a of the planetary gear carrier 43, and the nut member 32, a radial dimension M (see FIG. 1) of the housing 2 of the electric actuator 1 can be reduced.

Moreover, the rotor inner 26 serving as the hollow rotary shaft comprises the inner raceway surface 27a of the rolling bearing 27 arranged adjacent to the end portion of the rotor core 24a on the one side in the axial direction, and the end portion of the rotor inner 26 on the one side in the axial direction is supported by the rolling bearing 27 so as to be rotatable. With such a structure, the rotor inner 26 can be downsized in the axial direction. In addition, in combination with the structure in which the rolling bearing 27 is arranged within an axial width of the nut member 32, an axial dimension L (see FIG. 1) of the housing 2 of the electric actuator 1 can be reduced. When the axial dimension L and the radial dimension M of the housing 2 can be reduced as described above, the entire electric actuator 1 can be downsized, and hence the electric actuator 1 excellent in mountability with respect to a device to be used can be achieved.

Moreover, the screw shaft 33 is formed into the hollow shape, and the stroke detection sensor 55 configured to directly detect the amount of displacement of the screw shaft 33 in the axial direction is arranged on the inner periphery of the screw shaft 33. With such a configuration, it is not required that an installation space for the stroke detection sensor 55 be independently secured on, for example, the outer side of the motor part A in the axial direction. Thus, the electric actuator 1 excellent in operation accuracy of the screw shaft 33 while being compact in the axial direction can be achieved.

Further, as long as the rotation of the rotor 24 is balanced, it is only required that the rolling bearings 27 and 30 configured to support the rotor inner 26 be capable of supporting a radial load as small as the own weight of the rotor 24. In this case, it is not required that the rotor inner 26 integrally having the inner raceway surface 27a of the rolling bearing 27 be made of a material having a high strength. A required strength can be secured even when the rotor inner 26 is made of, for example, an inexpensive soft steel material for which thermal treatment such as quenching and tempering is omitted. In particular, in the electric actuator 1 of this embodiment, the rotary motion of the motor 25 is transmitted to the nut member 32 through the planetary gear speed reducer 10. Thus, the radial load is not generated. Moreover, the reaction force (thrust load) generated along with the linear motion of the screw shaft 33 is directly supported by the needle roller bearing 47 arranged adjacent to the nut member 32 on the another side in the axial direction. Thus, it is only required that the rolling bearing 27 have a function of positioning in the radial direction, and hence the above-mentioned material specification is sufficient for the rotor inner 26 integrally having the inner raceway surface 27a of the rolling bearing 27. With this configuration, the electric actuator 1 can be reduced in cost.

Moreover, as described above, when the needle roller bearing 47 is configured to directly support the thrust load acting on the nut member 32, the action of the moment load on the ball screw device 31 (motion conversion mechanism part B) and on the rotor 24 of the motor part A can be suppressed effectively. In particular, when the needle roller bearing 47 is arranged within the range in the axial direction between the rolling bearings 27 and 30 as in this embodiment, the effect of suppressing the moment load can be enhanced. When the moment load can be suppressed in this way, operation accuracy and durability life of the output member of the electric actuator 1 can be improved as well as the needle roller bearing 47 having a smaller size can be used.

The needle roller bearing 47 is arranged near a center portion in the axial direction between both of the rolling bearings 27 and 30 in this embodiment, and the effect of suppressing the moment load can thus be further enhanced in this case. Therefore, the downsizing of the needle roller bearing 47 can be further promoted. As a result, for example, the needle roller bearing 47 and the thrust receiving ring 46 having extremely small sizes can be employed. Consequently, the dimension in the axial direction of the electric actuator 1 can be prevented from increasing as much as possible.

Moreover, through the employment of the sandwich structure of sandwiching the terminal main body 50 between the casing 20 and the cover 29 in the axial direction, the configuration capable of drawing the lead line of the power supply circuit and the signal lines of the sensors out to the radially outer side of the housing 2, and the employment of the hollow screw shaft 33, there can also be achieved an electric actuator that is formed by arranging two electric actuators 1 (each formed by unitizing the motor part A, the motion conversion mechanism part B, and the terminal part D) in array in the axial direction, and is capable of independently operating two objects to be operated. Such an electric actuator can be preferably mounted to, for example, a dual clutch transmission (DCT), which is a type of the automatic transmission, and can contribute to the downsizing of the entire DCT.

In the above, description is made of the electric actuator 1 according to one embodiment of the present invention. However, the present invention is not limited to the embodiment described above.

For example, in the above-mentioned embodiment, the ball screw device 31 is employed for the motion conversion mechanism part B, but the present invention can be applied to the electric actuator employing a so-called sliding screw device in which the balls 34 and the deflectors 35 are omitted for the motion conversion mechanism part B. However, in consideration of operability and the like of the screw shaft 33, it is preferred that the ball screw device 31 be employed for the motion conversion mechanism part B.

Further, as the thrust bearing to be arranged adjacent to the nut member 32 on the another side in the axial direction, a rolling bearing other than the needle roller bearing 47, for example, a cylindrical roller bearing can be employed. However, in consideration of ability to support the thrust load and the axial dimension of the bearing, the needle roller bearing 47 is preferred.

Moreover, in the above-mentioned embodiment, the compression coil spring 48 having the function of, for example, always urging the screw shaft 33 toward the original point side is provided. However, it is only required that the compression coil spring 48 be provided as needed, and it is not always required that the compression coil spring 48 be provided.

Moreover, in the above-mentioned embodiment, the stroke detection sensor 55 is used. However, it is only required that the stroke detection sensor 55 be used as needed, and the stroke detection sensor 55 may be omitted in accordance with a device to be used.

Figure 12:
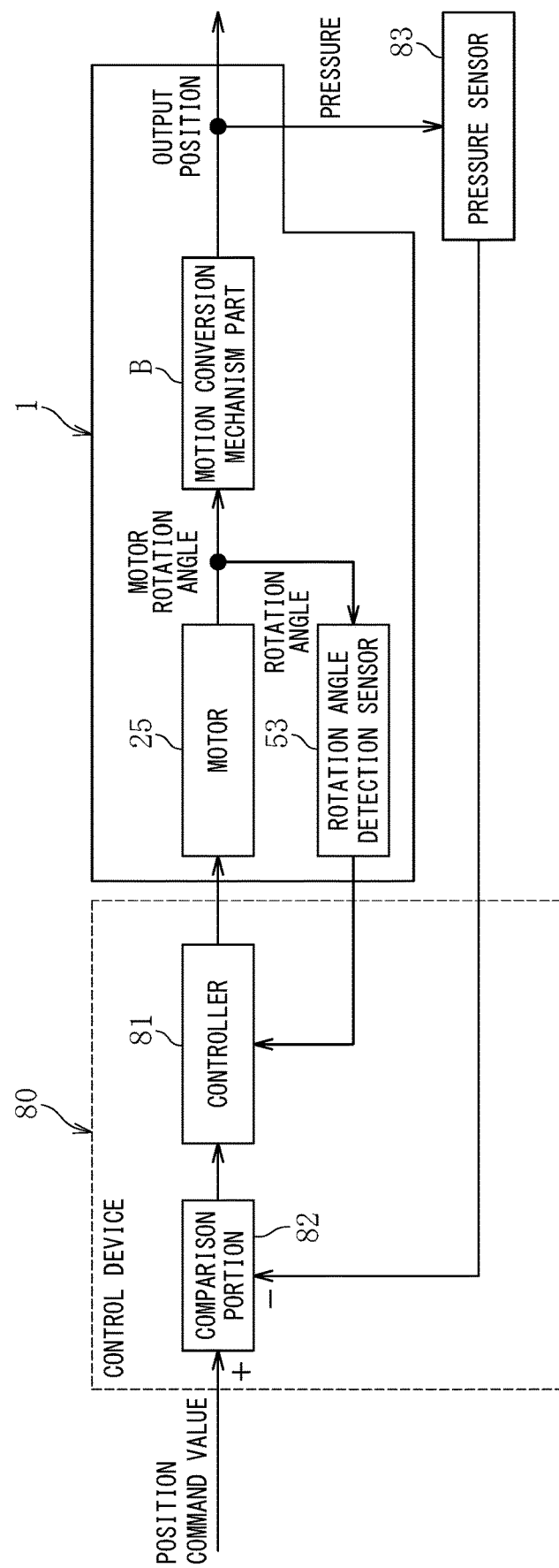
FIG. 12 is a schematic block diagram for illustrating a control system for an electric actuator according to another embodiment of the present invention.

With reference to FIG. 12, description is made of an example of the operation mode of the electric actuator 1 in a case in which the stroke detection sensor 55 is not used. FIG. 12 is a diagram for illustrating an example of pressure control, and a pressure sensor 83 is provided for an object to be operated (not shown). When the operation amount is input to the ECU (not shown), the ECU calculates a requested pressure command value. When the pressure command value is transmitted to the controller 81 of the control device 80, the controller 81 calculates a control signal of the rotation angle of the motor required in accordance with the pressure command value, and transmits the control signal to the motor 25. Then, as in the case described by referring to FIG. 11, the screw shaft 33 advances to a position based on the control signal of the controller 81, and the actuator head 39 mounted to the end portion of the screw shaft 33 on the one side in the axial direction operates an object to be operated (not shown).

The operation pressure of the screw shaft 33 (actuator head 39) is detected by the pressure sensor 83 provided externally, and is subjected to feedback control. Therefore, when the electric actuator 1 that does not use the stroke detection sensor 55 is applied to, for example, a brake-by-wire system, a hydraulic pressure of a brake can be reliably controlled.

As described above, when the stroke detection sensor 55 is not used, a solid screw shaft may be employed as the screw shaft 33, and the inner member 36 may be omitted. When the solid screw shaft 33 is used and the compression coil spring 48 is used, a screw shaft comprising a flange portion on an end portion thereof on the another side in the axial direction is employed as the screw shaft 33.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

REFERENCE SIGNS LIST 1 electric actuator
2 housing
10 planetary gear speed reducer
20 casing
24 rotor
25 motor
26 rotor inner (hollow rotary shaft)
29 cover
31 ball screw device
32 nut member
33 screw shaft
40 ring gear
41 sun gear
42 planetary gear
43 planetary gear carrier
43a cylindrical portion
47 needle roller bearing (thrust bearing)
48 compression coil spring
50 terminal main body
50A tubular portion
50c opening portion
A motor part
B motion conversion mechanism part
C operation part
D terminal part
L axial dimension of housing
M radial dimension of housing

The invention claimed is:

1. An electric actuator, comprising:
a motor part configured to drive upon receiving a supply of power;
a motion conversion mechanism part configured to convert a rotary motion of the motor part into a linear motion to output the linear motion; and
a housing configured to house the motor part and the motion conversion mechanism part,
wherein the motion conversion mechanism part comprises:
a screw shaft arranged coaxially with a rotation center of a rotor of the motor part; and
a nut member rotatably fitted to an outer periphery of the screw shaft,
wherein the screw shaft performs a linear motion in an axial direction along with a rotation of the nut member upon receiving a rotary motion of the rotor,
wherein the housing comprises a plurality of members coupled to one another in the axial direction,
wherein a terminal part configured to hold a power supply circuit configured to supply the power to the motor part comprises a tubular portion sandwiched by the members forming the housing from both sides in the axial direction, and
wherein at least a part of a stator of the motor part is fitted to an inner periphery of the tubular portion.

2. The electric actuator according to claim 1, wherein the terminal part is configured to hold a rotation angle detection sensor configured to detect a rotation angle of the rotor.

3. The electric actuator according to claim 1, wherein the tubular portion has an opening portion configured to cause an inside and an outside of the housing to communicate with each other.

4. The electric actuator according to claim 1,
wherein the rotor comprises a hollow rotary shaft, which has the nut member arranged on an inner periphery thereof, and is rotatably supported by rolling bearings arranged at two positions apart from each other in the axial direction, and wherein the hollow rotary shaft comprises an inner raceway surface of one of the two rolling bearings.

5. The electric actuator according to claim 4, wherein the inner raceway surface is arranged within an axial width of the nut member.

6. The electric actuator according to claim 1, wherein the motion conversion mechanism part further comprises a speed reducer configured to reduce a speed of a rotation of the rotor, and transmit the rotation to the nut member.

7. The electric actuator according to claim 6, wherein the speed reducer is a planetary gear speed reducer.

* * * * *